(12) United States Patent
Hall et al.

(10) Patent No.: US 7,766,998 B2
(45) Date of Patent: Aug. 3, 2010

(54) WATER EXTRACTION APPARATUS

(76) Inventors: David R. Hall, 2185 S. Larsen Pkwy., Provo, UT (US) 84606; Tyson J. Wilde, 2185 S. Larsen Pkwy., Provo, UT (US) 84606; Andrew Gerla, 2185 S. Larsen Pkwy., Provo, UT (US) 84606; Joshua Larsen, 2185 S. Larsen Pkwy., Provo, UT (US) 84606

( * ) Notice: Subject to any disclaimer, the term of this patent is extended or adjusted under 35 U.S.C. 154(b) by 441 days.

(21) Appl. No.: 12/016,502

(22) Filed: Jan. 18, 2008

(65) Prior Publication Data
US 2009/0183631 A1 Jul. 23, 2009

(51) Int. Cl.
*B01D 53/02* (2006.01)
(52) U.S. Cl. ............................ 95/113; 95/117; 95/126; 95/148; 96/118; 96/125; 96/143; 96/146
(58) Field of Classification Search ................ 95/113, 95/117, 126, 148; 96/108, 118, 125, 143, 96/146, 243, 244
See application file for complete search history.

(56) References Cited

U.S. PATENT DOCUMENTS

| 3,537,378 | A | * | 11/1970 | Daly ........................ 454/337 |
| 3,777,456 | A | | 12/1973 | Lund |
| 6,156,102 | A | | 12/2000 | Conrad |
| 6,511,525 | B2 | | 1/2003 | Spletzer |
| 2002/0046569 | A1 | | 4/2002 | Faqih |
| 2007/0028769 | A1 | | 2/2007 | Eplee |

\* cited by examiner

*Primary Examiner*—Robert A Hopkins
(74) *Attorney, Agent, or Firm*—Tyson J. Wilde

(57) ABSTRACT

In one aspect of the present invention, an apparatus for the extraction of water from air incorporated into a wall of a building has a cavity formed in the wall. The cavity has an air inlet and an air outlet. A condensing surface is disposed within the cavity and is adapted to direct condensed water to a water storage unit. In another aspect of the present invention, the cavity is formed between two different building walls.

19 Claims, 10 Drawing Sheets

1000

| Step | |
|---|---|
| Providing a cavity fromed in the wall of a building comprising an air inlet and an air outlet, the air inlet, the air outlet or combinations thereof comprising a gate, a condensing surface disposed within the cavity, a cold water pipe disposed proximate the condensing surface comprising a valve, at least one hygroscopic surface disposed within the cavity, at least one hot water pipe comprising a valve, and a water storage unit | 1001 |
| The gates are opened allowing air flow to enter the cavity through the air inlet and exit through the air outlet | 1002 |
| The hygroscopic surface collects water from the airflow and is saturated | 1003 |
| The gates close sealing the cavity | 1004 |
| The hot water pipe valve is opened and hot water flows into the at least one hot water pipe heating the hygroscopic surface producing water vapor | 1005 |
| The cold water pipe valve is opened and cold water flows into the cold water pipe cooling the condensing surface | 1006 |
| The water vapor collects on the condensing surface producing liquid water | 1007 |
| The liquid water is stored in the water storage unit | 1008 |
| The hygroscopic surface is dehydrated | 1009 |
| The hot water pipe valve and the cold water pipe valve are closed | 1010 |
| The gates are opened and the process is repeated | 1011 |

Fig. 10

WATER EXTRACTION APPARATUS

BACKGROUND OF THE INVENTION

The current invention relates to water processing. Water is an essential resource to every community. In many locations water may be scarce or expensive to purify for domestic use. Consequently, many efforts have been made to develop a more cost effective way to produce abundant sources of water.

U.S. Pat. No. 6,511,525 to Spletzer et al., which is herein incorporated by reference for all that it contains discloses a method and apparatus for extracting liquid water from moist air using minimal energy input. The method can be considered as four phases: (1) adsorbing water from air into a desiccant, (2) isolating the water-laden desiccant from the air source, (3) desorbing water as vapor from the desiccant into a chamber, and (4) isolating the desiccant from the chamber, and compressing the vapor in the chamber to form liquid condensate. The liquid condensate can be removed for use. Careful design of the dead volumes and pressure balances can minimize the energy required. The dried air can be exchanged for fresh moist air and the process repeated. An apparatus comprises a first chamber in fluid communication with a desiccant, and having ports to intake moist air and exhaust dried air. The apparatus also comprises a second chamber in fluid communication with the desiccant. The second chamber allows variable internal pressure, and has a port for removal of liquid condensate. Each chamber can be configured to be isolated or in communication with the desiccant. The first chamber can be configured to be isolated or in communication with a course of moist air. Various arrangements of valves, pistons, and chambers are described.

U.S. patent application Ser. No. 09/788,370 to Faqih, which is herein incorporated by reference for all that it contains discloses systems and methods for extraction of freshwater from ambient air in regions of extremely hot and humid climates, for supply of drinking water and freshwater for small to large groups of people in remote and isolated areas or wherever freshwater resources are not conveniently accessible. Compact mobile units are disclosed to provide freshwater and drinking water for resort areas, to passengers on land and sea vehicles, in situations of emergency, and to areas of water shortage. The art of adaptation of commercial dehumidification units is taught in design and construction of apparatus for production of freshwater and drinking water. Preparation of drinking water included ultraviolet disinfection, ozone treatment, and/or chlorine addition; activated carbon and ion exchange filters; and adding of fluorine, air/oxygen to refresh the water storage units, and minerals for taste and health provisions. For energy economy and use of independent electric power supply, the produced water may flow under gravitational forces entirely or with the assistance of small boasting pumps. Lukewarm, hot, cold, and/or cold carbonated drinking water are provided as well as freshwater for other usage.

U.S. Pat. No. 3,777,456 to Lund, which is herein incorporated by reference for all that it contains discloses that water is extracted from the atmosphere by circulating a large volume of a solution of lithium chloride in water continuously over a Munters packing in a tower of conventional cooling tower design. Excess solution formed as a result of the absorbtion of water is bled off and passed through a desalination plant where product water is produced. Concentrated brine is returned to the circulation volume.

U.S. Pat. No. 6,156,102 to Condrad et al., which is herein incorporated by reference for all that it contains discloses a process of separating water from ambient air involves a liquid desiccant to first withdraw water from air and treatment of the liquid desiccant to produce water and regenerated desiccant. Water lean air is released into the atmosphere. Heat generated in the process is recycled. The drying capacity, or volume of water produced, of the system for a given energy input is favored over the production of dried air.

U.S. patent application Ser. No. 11/198,771 to Eplee et al., which is herein incorporated by reference for all that it contains discloses a method and apparatus for extracting liquid water from ambient air, including ambient air in severely arid and hot climates. An example apparatus uses a sorption-desorption-condensation cycle using a sorption wheel to extract moisture from ambient air and concentrate the water vapor driven off from the sorption material in a circulating gas, with condensation of liquid water from the circulating gas.

BRIEF SUMMARY OF THE INVENTION

In one aspect of the present invention, an apparatus for the extraction of water from air incorporated into a wall of a building has a cavity formed in the wall. The cavity has an air inlet and an air outlet. A condensing surface is disposed within the cavity and is adapted to direct condensed water to a water storage unit.

A heater may be disposed within the cavity. The heater may have at least one hot water pipe. The at least one hot water pipe may have a valve. The heater may have a geothermal heat source.

The condensing surface may be corrugated. At least one cool water pipe may be proximate the condensing surface. The at least one cool water pipe may have an expansion region proximate the condensing surface. The at least one cool water pipe may have a valve.

At least one hygroscopic surface may be disposed with in the cavity. The at least one hygroscopic surface may have a material selected from a group consisting of lithium chloride, calcium chloride, magnesium chloride, zinc chloride, sodium chloride, Carnallite, glycol, glycerin, sulfuric acid, sodium hydroxide, inorganic salts, or combinations thereof. A moisture sensor may be disposed within the hygroscopic surface. The at least one hygroscopic surface may rotate on an axis. The hygroscopic surface may be retained within the cavity by a shelf, a screen or combinations thereof.

The air inlet, the air outlet, or combinations thereof may have a gate. The apparatus may have at least one valve and at least one gate operated on a timer, a sensor or combinations thereof. The air outlet and air inlet may be adapted to direct air flow across the condensing surface.

The cavity may have a closed circuit loop comprising the at least one hot water pipe and a geothermal heat source and another closed circuit loop comprising the at least one cool water pipe and at least one well. The cavity may have a closed loop circuit comprising at least one hot water pipe, at least one cool water pipe, and a geothermal heat source.

In another aspect of the present invention, the cavity is formed between two different building walls.

In yet another aspect of the present invention, a method for the extraction of water from air, using the steps of providing a cavity formed in the wall of a building has an air inlet and an air outlet, the air inlet, the air outlet or combinations thereof comprising a gate, a condensing surface disposed within the cavity, at least one cool water pipe disposed proximate the condensing surface comprising a valve, at least one hygroscopic surface disposed within the cavity, at least one hot water pipe comprising a valve, and a water storage unit; the gates are opened allowing air flow to enter the cavity through the air inlet and exit through the air outlet; the hygroscopic surface collects water from the airflow and is saturated; the gates close sealing the cavity; the hot water pipe valve is opened and hot water flows into the at least one hot water pipe heating the hygroscopic surface producing water vapor; the cool water pipe valve is opened and cool water flows into the at least one cool water pipe cooling the condensing surface; the water vapor collects on the condensing surface producing liquid water; the liquid water is stored in the water storage unit; the hygroscopic surface is dehydrated; the hot water pipe valve and the cool water pipe valve are closed; the gates are opened and the process is repeated.

BRIEF DESCRIPTION OF THE DRAWINGS

FIG. 10 is a method of an embodiment for the extraction of water from air.

DETAILED DESCRIPTION OF THE INVENTION AND THE PREFERRED EMBODIMENT

Figure 1:
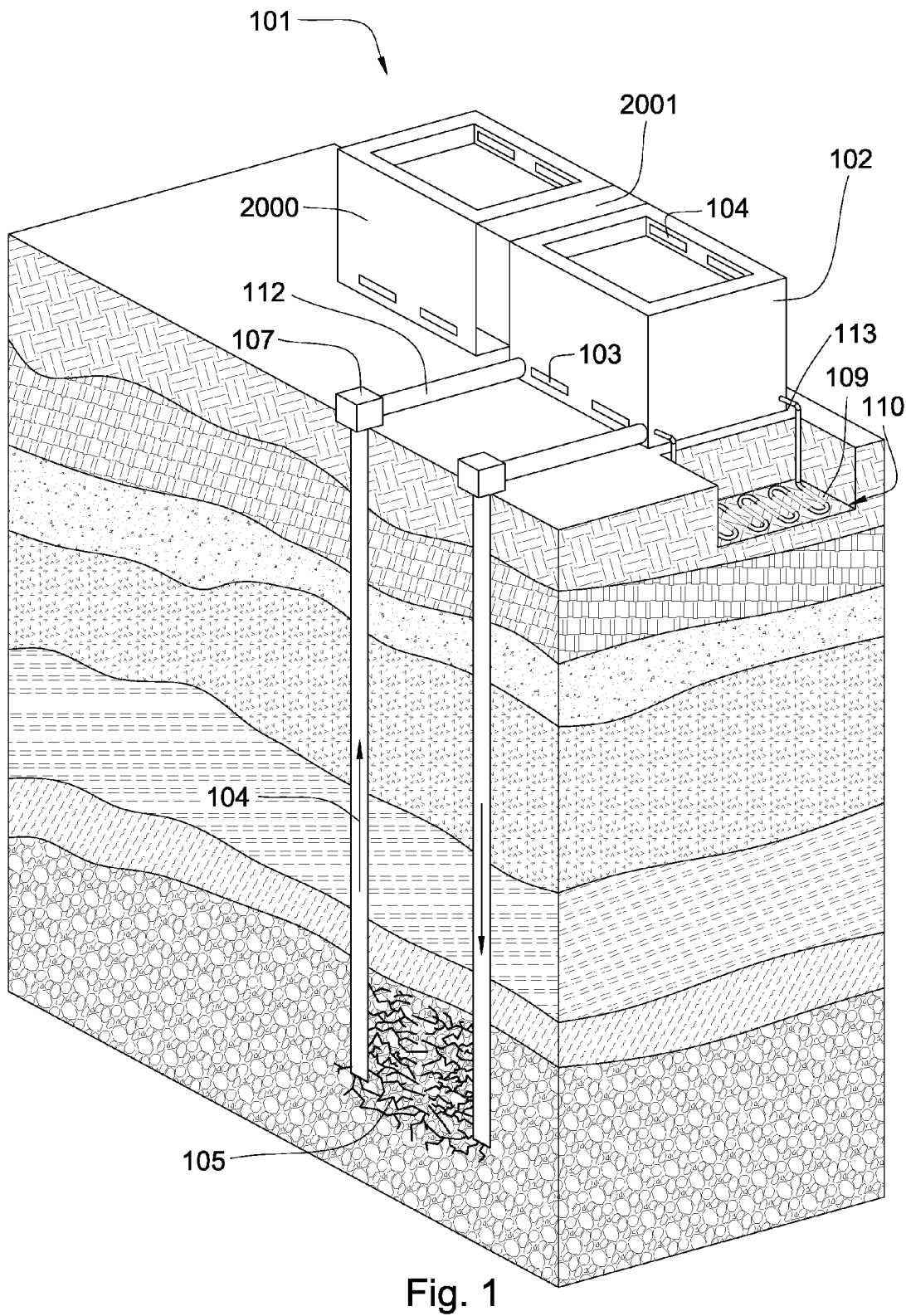
FIG. 1 is a perspective diagram of an embodiment of buildings, a geothermal source and at least one well.

FIG. 1 is a prospective diagram of an embodiment of building 101 and building 2000. The buildings 101, 2000 may be a residential building, a commercial building, an industrial building, an educational building, recreations 1 building, government building or combinations thereof. The buildings 101, 2000 may be in communication with at least one pumping station 107 that may pump hot water 104 into a geothermal heat source 105 to collect heat and pump the heated water to the building 101 through at least one hot water pipe 112. After the hot water 104 has been utilized by buildings 101, 2000 the water 104 may be directed back to the at least one pumping station 107 and back to the geothermal heat source 105 where the water again collects heat from the source such that the water may be reused in either building. After the hot water 104 has been utilized by the buildings the water 104 may be used or some other source before the water 104 is directed back into the earth The may be a space 2001 between the buildings 101, 2000 where the cool and heated water are directed to.

The at least one pumping station 107 may also pump cool water 109 from shallow wells 110 to the building 101 via at least one cool water pipe 113 in a similar fashion The earth is typically a consistent temperature of 45 to 60 degrees at shallow depths. Water may be circulated in this depth to cool water, which water may then be circulated through the building to cool or heat (depending on the ambient outside temperature) parts of the building. After the cool water 109 has been utilized by the building 101 the water 109 may be directed back to the at least one pumping station 107 and back to the shallow well 110. The geothermal heat source may be located within the earth below 5,000 feet. In some embodiments the earth is hot enough at 20,000 feet to power the present invention. In some embodiments, such as in situations where the earth comprises a fault, a volcanic formation, or other formation likely b generate shallow geothermal sources, the wells tapping into the geothermal source may be much shorter.

Figure 2:
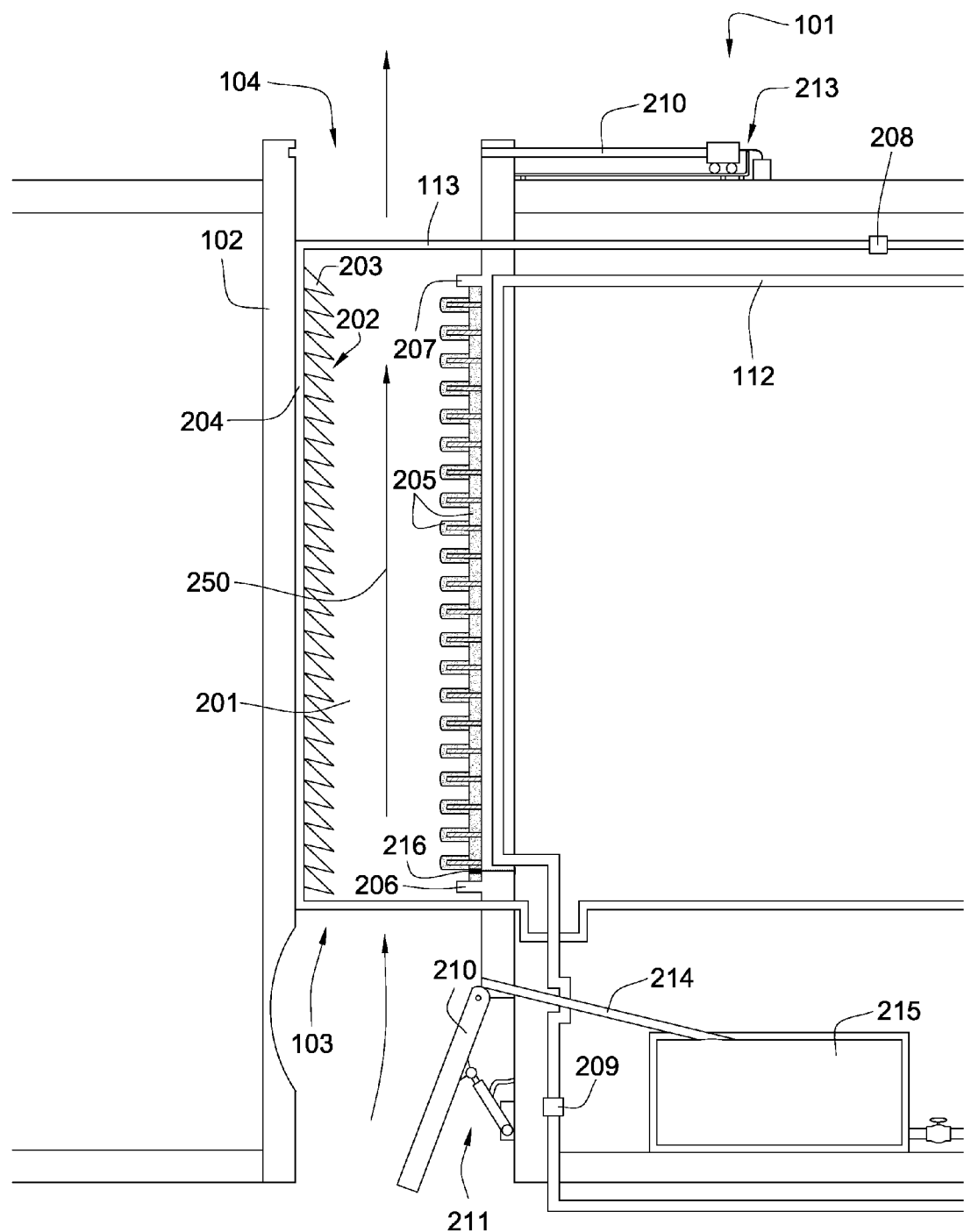
FIG. 2 is a cross-sectional diagram of an embodiment of an apparatus for the extraction of water from air.
Figure 3:
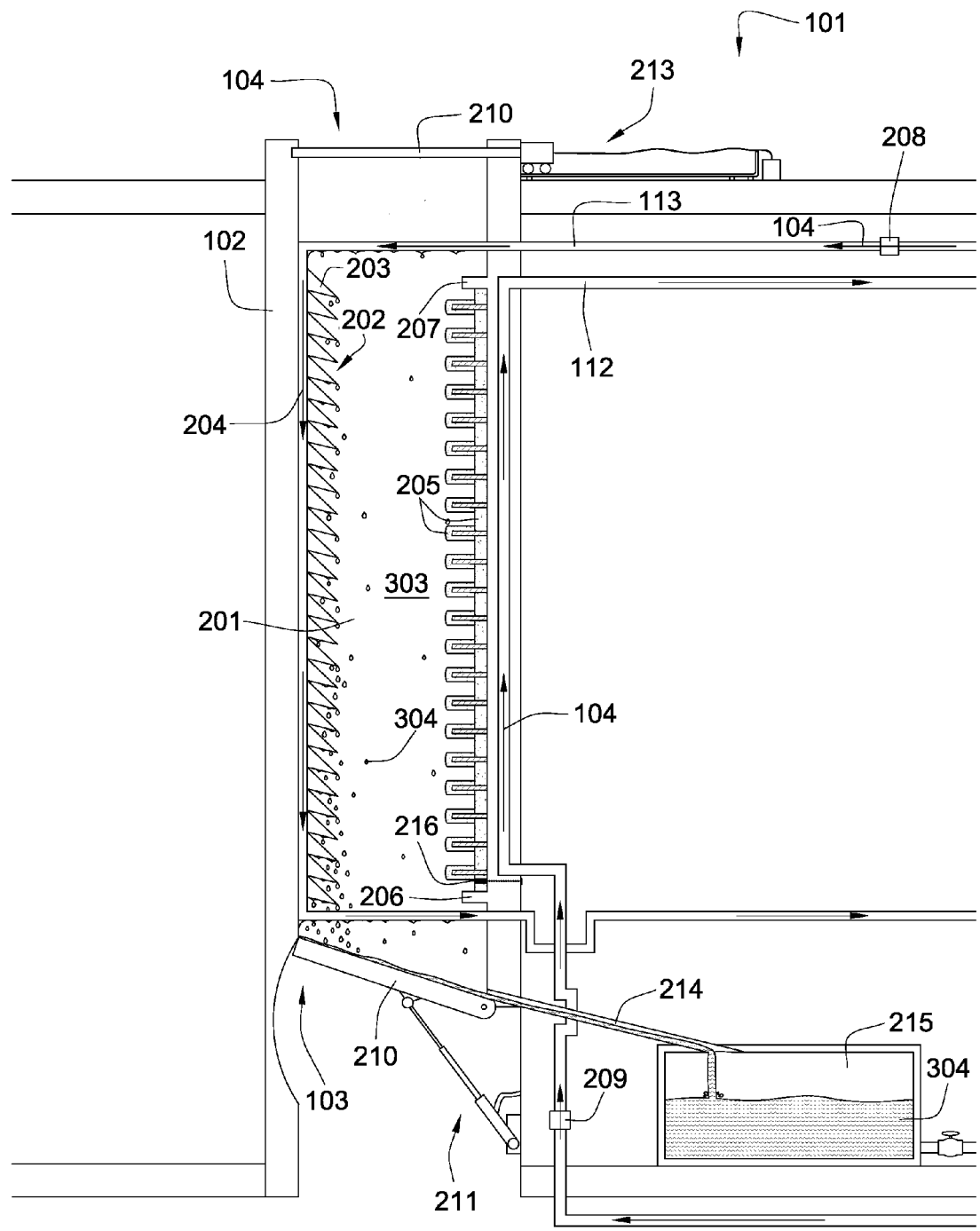
FIG. 3 is a cross-sectional diagram of another embodiment of an apparatus for the extraction of water from air.

Referring to FIGS. 2 through 3, the building 101 may comprise a wall 102 with a cavity 201. In some embodiments, the cavity is actually formed between the walls of two different buildings such as the buildings shown in FIG. 1. The cavity 201 may comprise an air inlet 103 through which air flow 250 may enter the cavity 201 and an air outlet 104 through which air flow 250 may exit the cavity 201. At least one hygroscopic surface 205 may be disposed within the cavity 201. As the air flow 250 passes through the cavity 201 the at least one hygroscopic surface 205 collects water 304 from the air flow 250 through absorption, adsorption or combinations thereof. The at least one hygroscopic surface 205 may comprise a material selected from a group consisting of salt, lithium chloride, calcium chloride, magnesium chloride, zinc chloride, sodium chloride, Carnallite, glycol, glycerin, sulfuric acid, sodium hydroxide, inorganic salts, or combinations thereof. A shelf 206 may be disposed within the cavity 201 proximate the at least one hygroscopic surface 205 and may support the at least one hygroscopic surface 205. A hood 207 may be disposed within the cavity 207 proximate the at least one hygroscopic surface 205 and may protect the at least one hygroscopic surface 205 from precipitation. A moisture sensor 216 may be disposed within the at least one hygroscopic surface 205.

A condensing surface 202 may be disposed within the cavity 201 opposite the hygroscopic surface 205. Cool water 109 from the shallow wells 110 may be directed adjacent to the condensing surface 202 by the at least one cool water pipe 113. The at least one cool water pipe 113 may comprise an expansion region 204 proximate the condensing surface. In some embodiments expansion may extend the entire length and width of the condensing surface 202 or in other embodiments the expansion region may only be adjacent a portion of the condensing surface. The expansion region may be adapted to lower the pressure within the cool water pipes adapted to cause the water to absorb heat and therefore contribute to cooling the condensing surface. The at least one cool water pipe 113 may comprise a valve 208 adapted to allow cool water to flow through the pipes or to obstruct cool water from flowing. The valve 208 may be operated manually, by the moisture sensor 216, on a timer or combinations thereof. The condensing surface 202 may be corrugated. The corrugated condensing surface 202 may comprise folds 203, blades 203, spikes 203, fingers 203 or combinations thereof. The folds 203, blades 203, spikes 203, and/or fingers 203 may generally point downward. It is believed that the surface area of the condensing surface 202 will be increased by corrugating the condensing surface 202.

A heater may be disposed within the cavity 201 and be adjacent the hygroscopic surface 205. The heater may comprise the at least one hot water pipe 112 carrying the hot water 104 provided from the geothermal heat source 105. The at least one hot water pipe 112 may comprise a valve 209 adapted to allow the heated water to flow through the pipes or to obstruct heated water from flowing. The valve 209 may be operated manually, by the moisture sensor 216, on a timer or combinations thereof.

The air inlet 103, the air outlet 104, or combinations thereof may comprise a gate 210. The gate 210 for the air inlet 103 and the gate 210 for the air outlet may actuate through the use of a hydraulic arm 211, a motor 213, a track, a selenoid, or combinations thereof. The gates 210 may seal off the cavity 201 air-tight. The gates 210 may be operated manually, by the moisture sensor 216, on a timer or combinations thereof. The gates 210 remain open allowing air flow 250 to enter and exit the cavity 201 until the hygroscopic surface 205 is saturated with water or until the hygroscopic surface reaches a predetermined wetness threshold. After the hygroscopic surface 205 is saturated with water or reaches the threshold the gates 210 are closed and the valves 208, 209 in the cool and heated water pipes are opened allowing the hot water 104 from the geothermal source 105 to flow into the at least one hot water pipe 112 and the cool water 109 to flow into the at least one cool water pipe 113. Heat is radiated into the hygroscopic surface 205 from the hot water pipe 205 and the water in the hygroscopic surface 205 is released as it turns to water vapor 303. The cool water pipe 113 and the cool water 109 cool the condensing surface 202 and the water vapor 303 condenses on the condensing surface producing condensed water 304. The condensed water 304 falls from the condensing surface 202 and may be channeled to a water storage unit 215. After the hygroscopic surface 205 is dehydrated or reaches a predetermined dryness threshold, the valves 208, 209 are closed and the gates 210 are opened allowing air to circulate again in the cavity 201.

In some embodiments where the ambient outside air is generally cooler than 55 degrees Fahrenheit, the ambient outside air may be used to cool the condensing surface, by placing the condensing surface adjacent a wall of the cavity.

Figure 4:
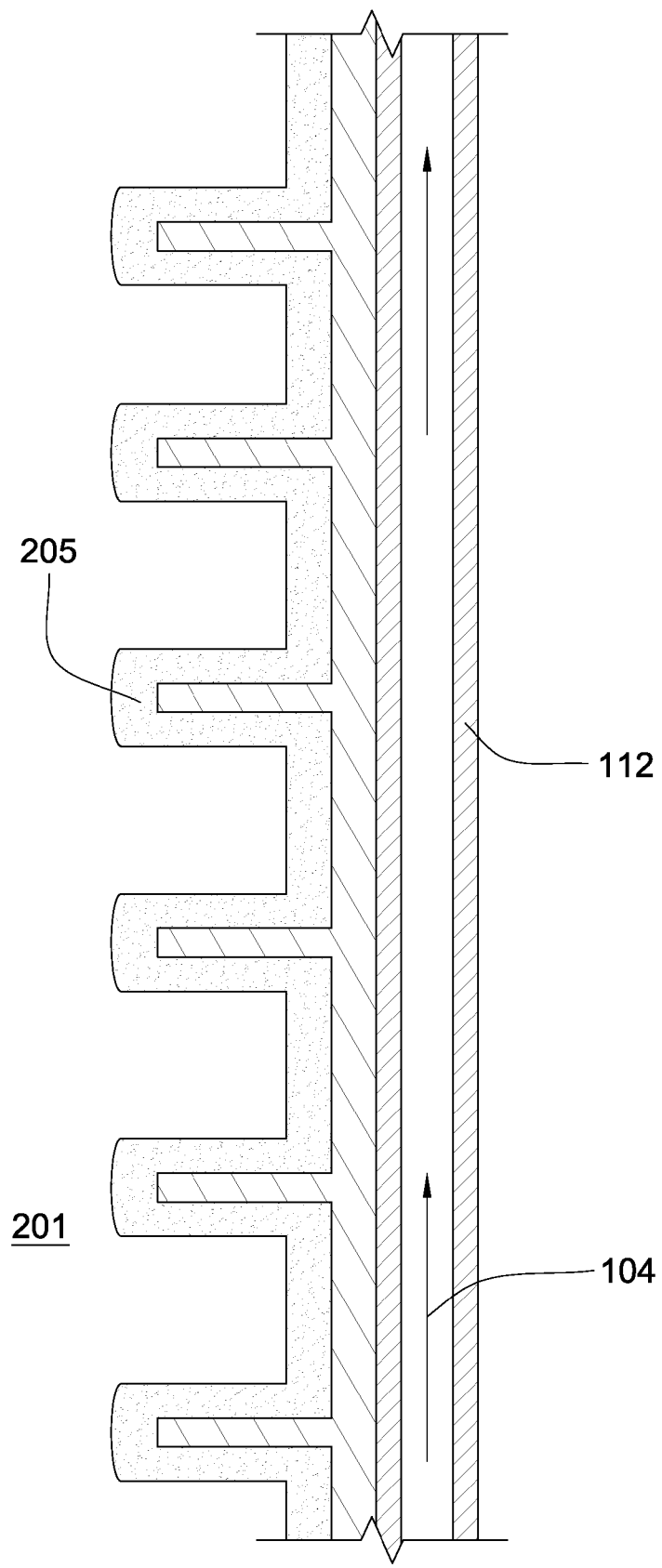
FIG. 4 is a cross-sectional diagram of an embodiment of a hygroscopic surface.
Figure 5:
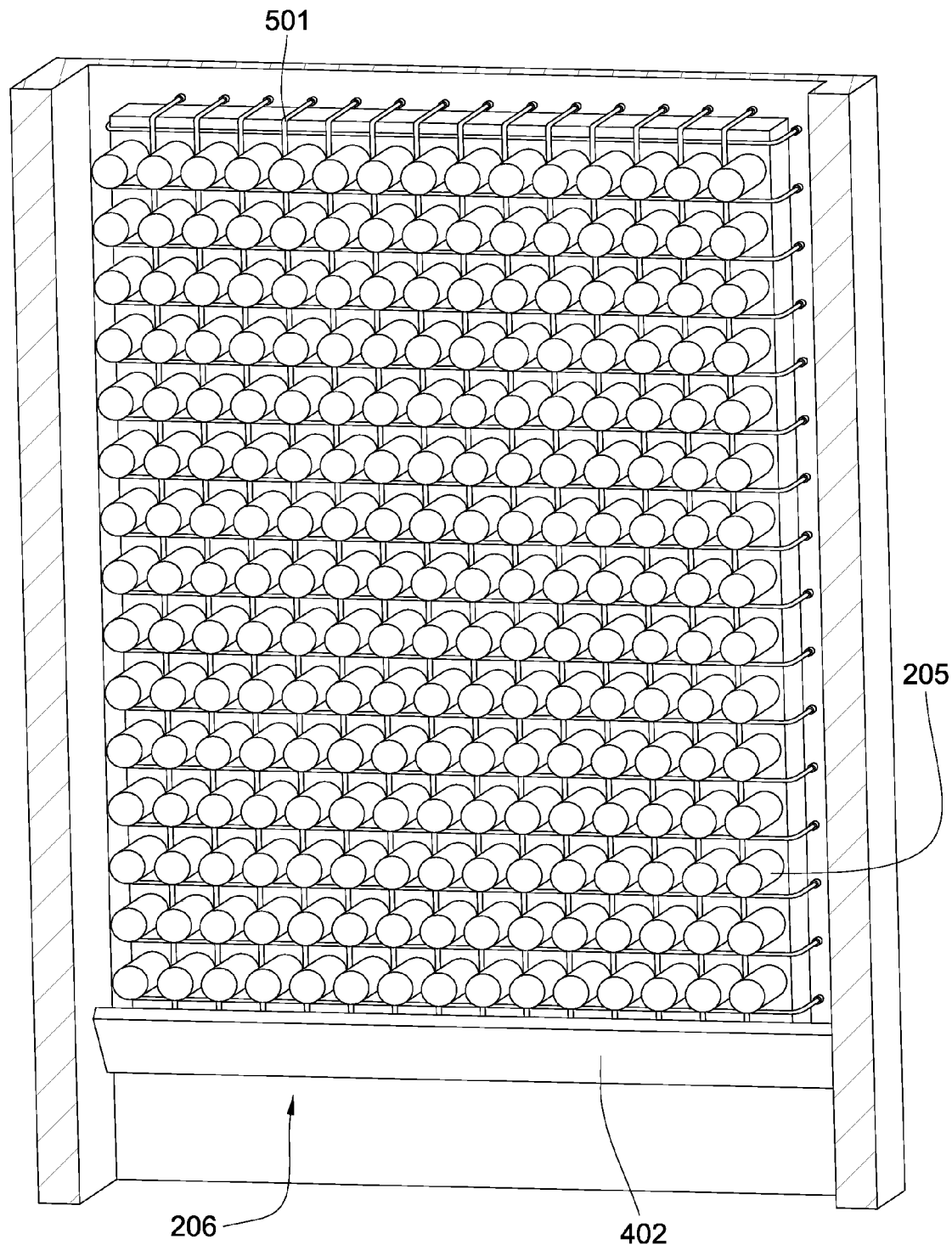
FIG. 5 is a cross-sectional diagram of another embodiment of a hygroscopic surface.

Referring now to FIGS. 4 through 5, a plurality of shelves 402 may be disposed in the cavity 201. Each of the plurality of shelves 402 may support a hygroscopic surface 205. Each of the plurality of shelves 402 may comprise a generally upward curved lip. It is believed that if the hygroscopic surface 205 degrades the generally upward curved lip will collect pieces of the hygroscopic surface 205. A screen 501 may be disclosed within the cavity 201 covering and supporting the hygroscopic surface 205. The screen 501 may comprise metal or a synthetic material. The salt may be contained an a plurality of pegs, which may affectivity increase the salt's surface area.

Figure 6:
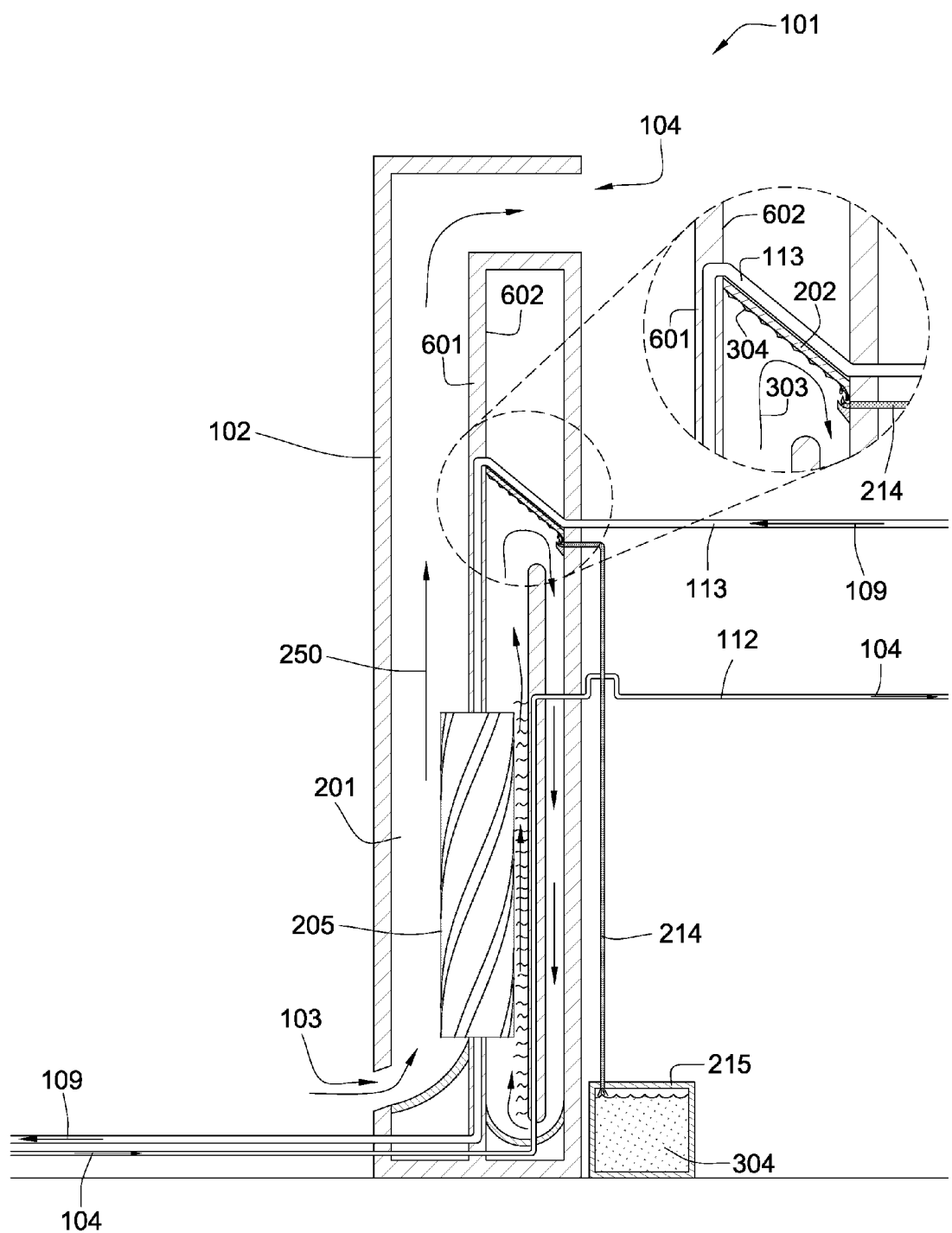
FIG. 6 is a cross-sectional diagram of another embodiment of an apparatus for the extraction of water from air.
Figure 7:
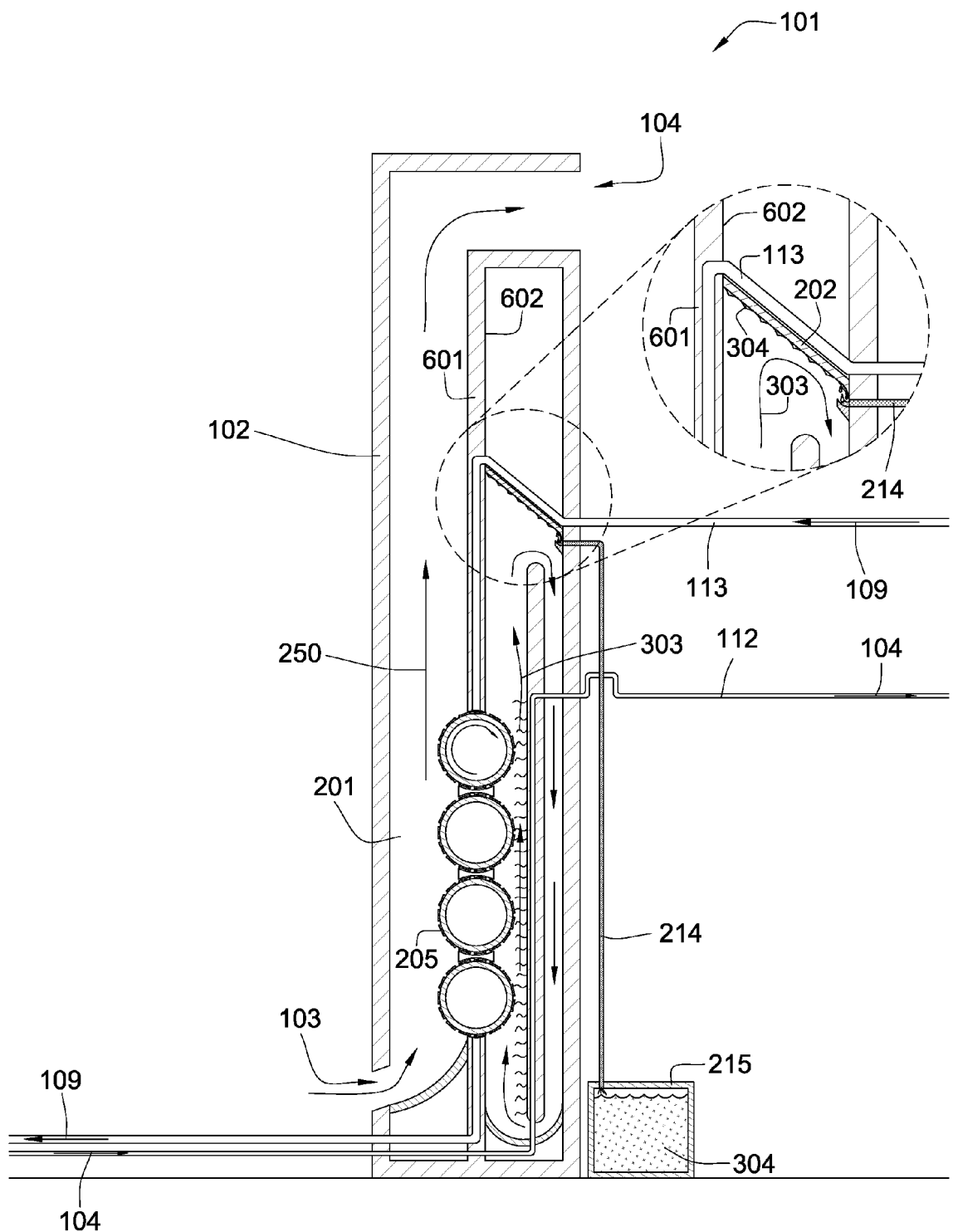
FIG. 7 is a cross-sectional diagram of another embodiment of an apparatus for the extraction of water from air.

Referring now to FIGS. 6 through 7, a barrier 601 and the hygroscopic surface 205 may isolate the condensing surface 202 and the at least one hot water pipe 112 from the air flow 250 in the cavity 201. The hygroscopic surface 205 may be rotated on an axis by the air flow 250. FIG. 6 disclosed an embodiment where the hygroscopic surface is rotated along an axis in the general direction of the air flow and FIG. 7 discloses an embodiment where the hygroscopic surface rotated in a direction generally normal to the air flow. As the hygroscopic surface 205 rotates it collects water from the air flow 250 and carries the water across the barrier to the isolated side 602 where the water is converted to water vapor 303 by heat radiated from the at least one hot water pipe 112. The water vapor 303 condenses on the condensing surface 202 also within the isolated side of the chamber. The condensing surface 202 may have a slope so as to assist in directing the condensed water 304 to a channel 214 that will direct the condensed water 304 to the water storage unit 215.

Figure 8:
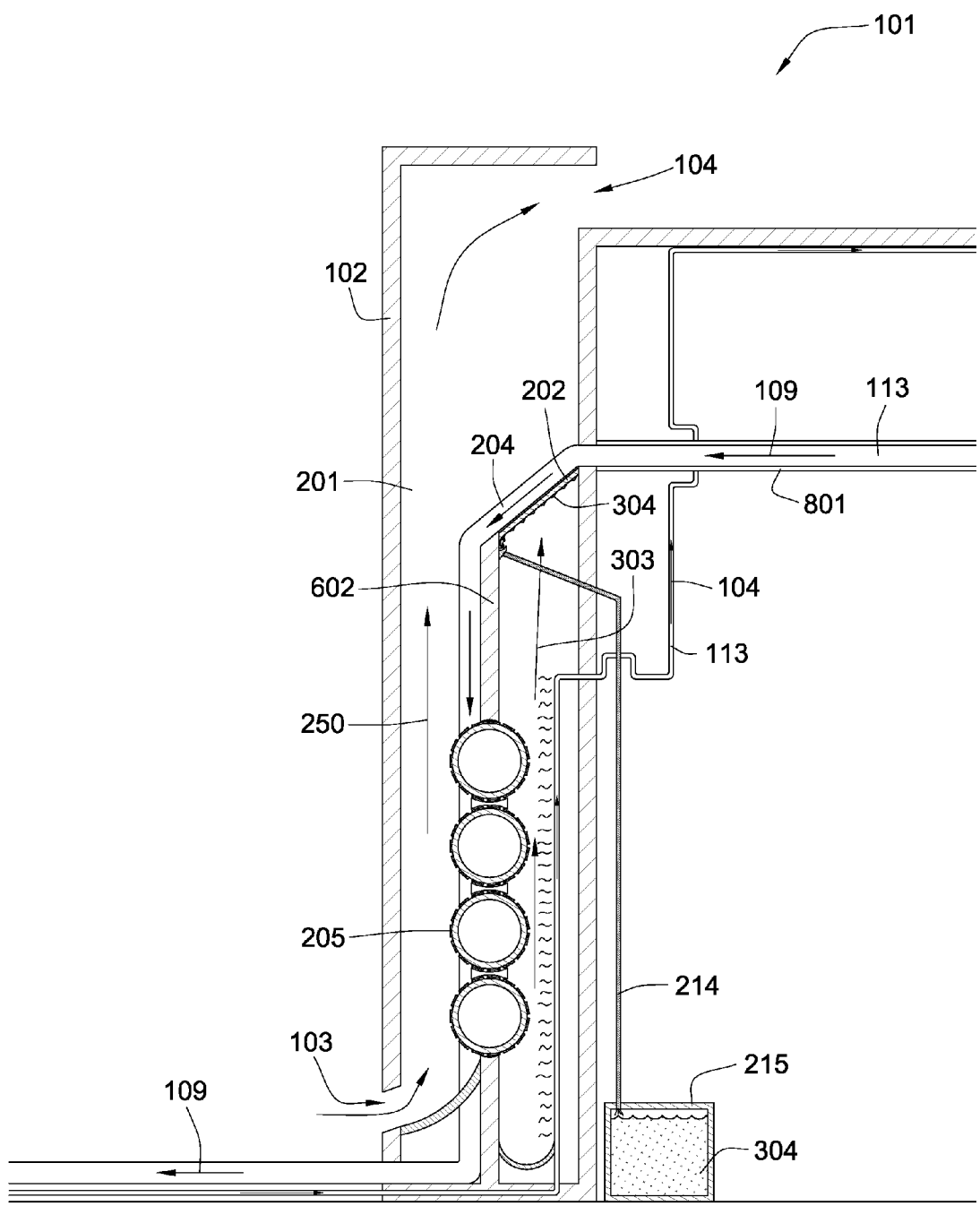
FIG. 8 is a cross-sectional diagram of another embodiment of an apparatus for the extraction of water from air.

FIG. 8 discloses an embodiment wherein the at least one cool water pipe 113 and the condensing surface 202 may be disposed in the cavity 201 in direct communication with the air flow 250. The air inlet 103 and air outlet 104 may be adapted to direct the air flow 250 across the condensing surface 202. It is believed that as the air flow 250 is directed across the condensing surface 202 and across the at least one cool water pipe 113 the air flow 250 may further cool the condensing surface 202 and the at least one cool water pipe 113. A length of the at least one cool pipe 113 disposed intermediate the pumping station 107 and the cavity 201 may be insulated 801 so as to prevent the cool water 109 from absorbing ambient heat as it travels from the pumping station 107 to the cavity 201.

Figure 9:
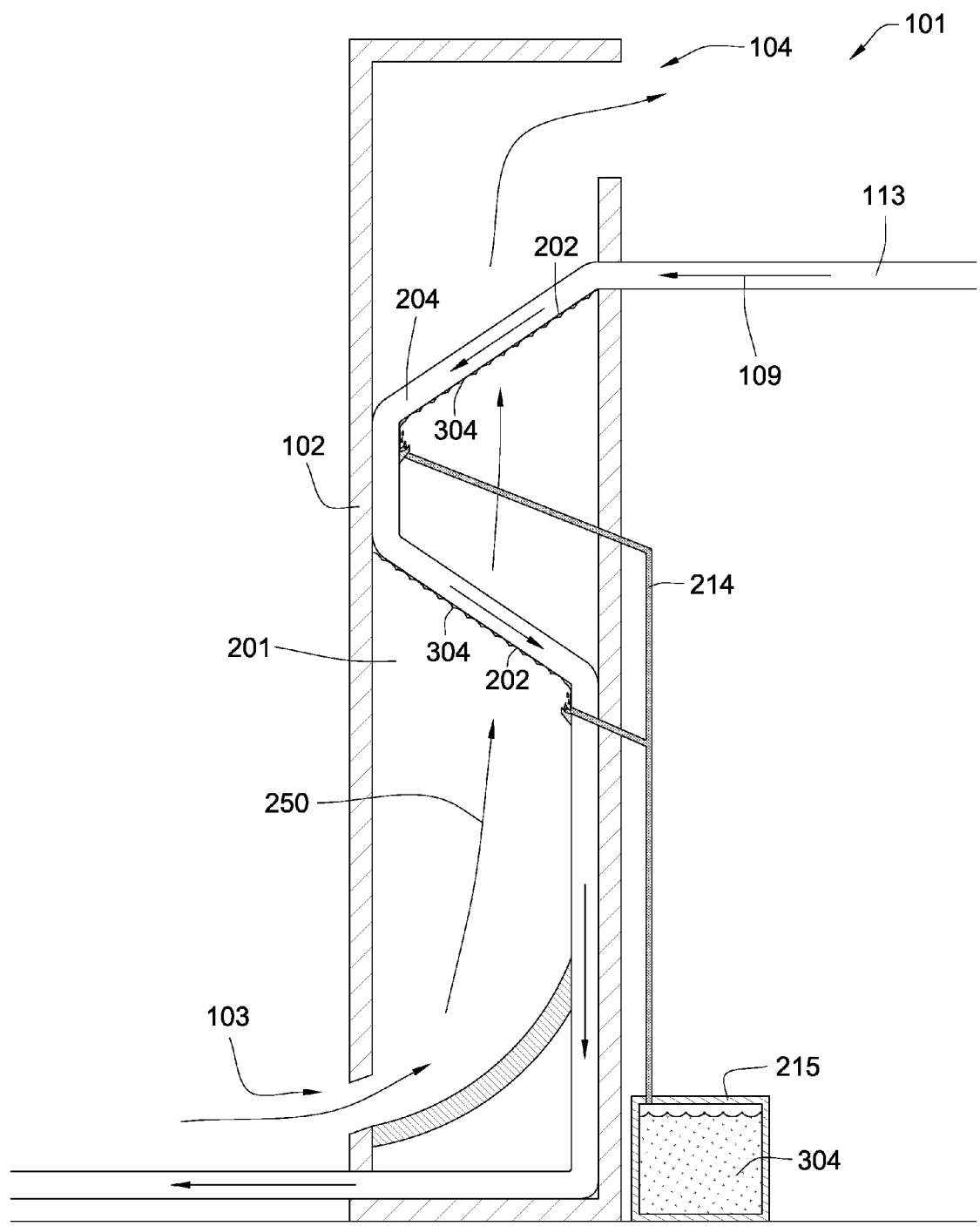
FIG. 9 is a cross-sectional diagram of another embodiment of an apparatus for the extraction of water from air.

Referring now to FIG. 9, the cavity may comprise a single closed loop consisting of the at least one cool water pipe 113, the at least one pumping station 107, and the shallow well 110. As the air flow 250 circulated through the cavity 201 water 304 will condense on the condensing surfaces 202. The condensed water 304 is directed to the channel 214 which directs the condensed water 304 to the water storage unit 215.

FIG. 10 is a method 1000 of an embodiment for the extraction of water from air and may include the steps of providing 1001 a cavity formed in the wall of a building comprising an air inlet and an air outlet, the air inlet, the air outlet or combinations thereof comprising a gate, a condensing surface disposed within the cavity, a cool water pipe disposed proximate the condensing surface comprising a valve, at least one hygroscopic surface disposed within the cavity, at least one hot water pipe comprising a valve, and a water storage unit; the gates are opened 1002 allowing air flow to enter the cavity through the air inlet and exit through the air outlet; the hygroscopic surface collects 1003 water from the airflow and is saturated; the gates close 1004 sealing the cavity; the hot water pipe valve is opened 1005 and hot water flows into the at least one hot water pipe heating the hygroscopic surface producing water vapor; the cool water pipe valve is opened 1006 and cool water flows into the cool water pipe cooling the condensing surface; the water vapor collects 1007 on the condensing surface producing liquid water; the liquid water is stored 1008 in the water storage unit; the hygroscopic surface is dehydrated 1009; the hot water pipe valve and the cool water pipe valve are closed 1010; the gates are opened 1011 and the process is repeated.

Whereas the present invention has been described in particular relation to the drawings attached hereto, it should be understood that other and further modifications apart from those shown or suggested herein, may be made within the scope and spirit of the present invention.

What is claimed is:

1. An apparatus for the extraction of water from air incorporated into a wall of a building, comprising:
    a cavity formed in the wall comprising an air inlet and an air outlet;
    a condensing surface disposed within the cavity; and
    the condensing surface adapted to direct condensed water to a water storage unit;
    wherein a heater is disposed within the cavity.

2. The apparatus of claim 1, wherein the heater comprises at least one hot water pipe.

3. The apparatus of claim 2, wherein the at least one hot water pipe comprises a valve.

4. The apparatus of claim 1, wherein the heater comprises a geothermal heat source.

5. The apparatus of claim 1, wherein the condensing surface is corrugated.

6. The apparatus of claim 1, wherein at least one cool water pipe is proximate the condensing surface.

7. The apparatus of claim 6, wherein the at least one cool water pipe comprises an expansion region proximate the condensing surface.

8. The apparatus of claim 6, wherein the at least one cool water pipe comprises a valve.

9. The apparatus of claim 1, wherein at least one hygroscopic surface is disposed with in the cavity.

10. The apparatus of claim 9, wherein the at least one hygroscopic surface comprises a material selected from a group consisting of salt, lithium chloride, calcium chloride, magnesium chloride, zinc chloride, sodium chloride, Carnallite, glycol, glycerin, sulfuric acid, sodium hydroxide, inorganic salts, or combinations thereof.

11. The apparatus of claim 9, wherein a moisture sensor is disposed within the hygroscopic surface.

12. The apparatus of claim 9, wherein the at least one hygroscopic surface rotates on an axis.

13. The apparatus of claim 1, wherein the air inlet, the air outlet, or combinations thereof comprise a gate.

14. The apparatus of claim 1, wherein the apparatus comprises at least one valve and at least one gate operated on a timer, a sensor or combinations thereof.

15. The apparatus of claim 1, wherein the air outlet and air inlet is adapted to direct air flow across the condensing surface.

16. The apparatus of claim 1, wherein the cavity comprises a closed loop circuit comprising at least one hot water pipe and a geothermal heat source and another closed circuit loop comprising at least one cool water pipe and a well.

17. The apparatus of claim 1, wherein the cavity comprises a closed loop circuit comprising at least one hot water pipe, at least one cool water pipe, and a geothermal heat source.

18. A method for the extraction of water from air, comprising:
    providing a cavity formed in the wall of a building comprising an air inlet and an air outlet, the air inlet, the air outlet or combinations thereof comprising a gate, a condensing surface disposed within the cavity, at least one cool water pipe disposed proximate the condensing surface comprising a valve, at least one hygroscopic surface disposed within the cavity, at least one hot water pipe comprising a valve, and a water storage unit;
    allowing air to enter the cavity by opening the gate such that the hygroscopic surface collects water from the airflow;
    substantially sealing cavity by closing the gates;
    heating the hygroscopic surface by opening the hot water pipe valve such that hot water flows into the at least one hot water pipe and heats the hygroscopic surface producing water vapor;
    cooling the condensing surface by opening the cool water pipe valve such that cool water flows into the at least one cool water pipe and water vapor collects on the condensing surface producing liquid water; and
    directing the liquid water to the water storage unit.

19. An apparatus for the extraction of water from air incorporated between two building walls, comprising:
    a cavity formed between the walls comprising an air inlet and an air outlet;
    a condensing surface disposed within the cavity; and
    the condensing surface adapted to direct condensed water to a water storage unit;
    wherein a heater is disposed within the cavity.

* * * * *